May 8, 1962 D. M. PHILLIPS 3,033,912
PEDESTALS FOR UNDERGROUND WIRING SYSTEMS
Filed Jan. 14, 1960
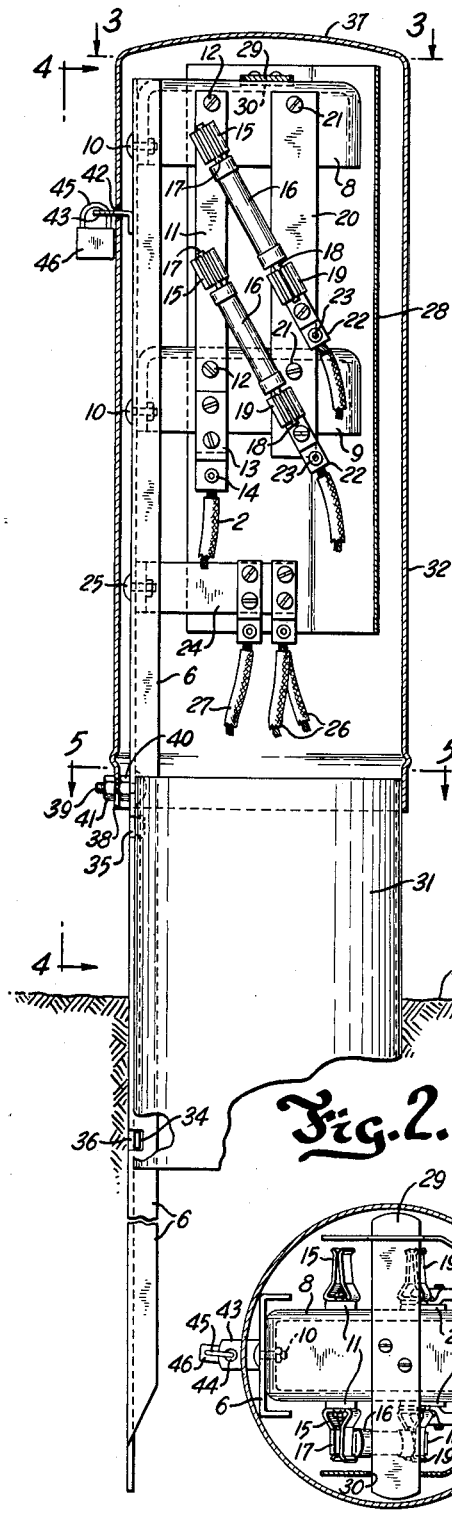
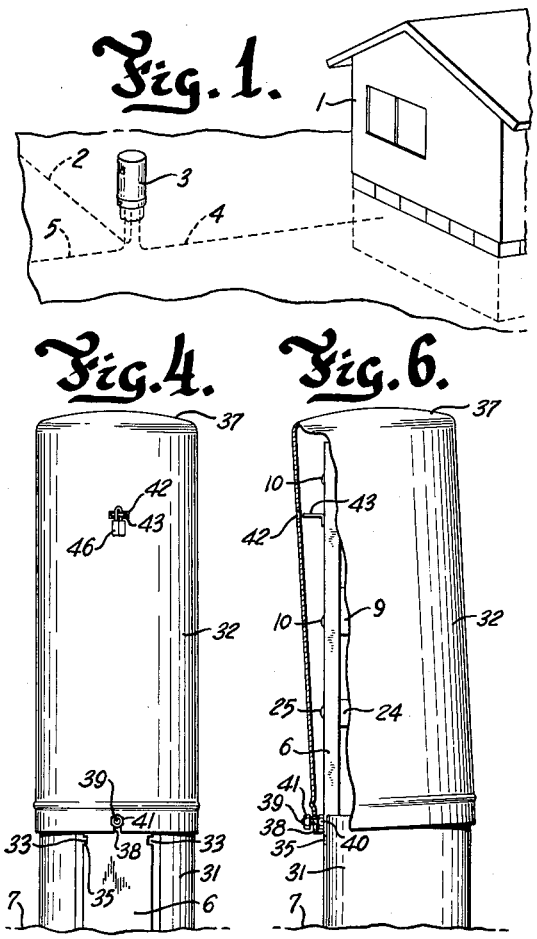
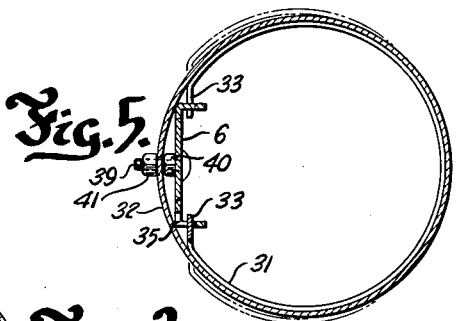
INVENTOR.
Davis M. Phillips
BY
Andrus & Starke
Attorneys

United States Patent Office  3,033,912
Patented May 8, 1962

3,033,912
PEDESTALS FOR UNDERGROUND
WIRING SYSTEMS
Davis M. Phillips, South Milwaukee, Wis., assignor to McGraw-Edison Company, Milwaukee, Wis., a corporation of Delaware
Filed Jan. 14, 1960, Ser. No. 2,516
12 Claims. (Cl. 174—38)

This invention relates to an enclosed pedestal for underground wiring systems and is particularly directed to a pedestal adapted to house and enclose connection means for interconnecting the secondary mains to service laterals in a conventional underground power distribution system.

In an underground distribution system, the conductors are buried in the ground either within protective conduits or suitable coverings to protect the conductors against moisture and mechanical damage.

Buried wiring systems have many desirable and well known features. Thus, storms, floods and similar natural catastrophies and phenomena can not greatly affect or interrupt the power distribution system. Similarly, the system is not subject to severe corrosion problems which exist in overhead systems particularly in seacoast and adjacent areas having high salt water conditions. Underground systems are particularly desirable in relatively densely populated cities where heavy conductors and multiple service connections to buildings are made.

In buried systems, a central distribution transformer is provided having a secondary main which extends for substantial distances and is connected by suitable secondary service laterals to a plurality of customers. Means must be provided adjacent the takeoff points for the laterals to effect the necessary connections to the various buildings being serviced. Following the initial installation, additions or corrections of service connections often are necessary and faulty conductors must be readily isolated. Consequently, the service connections must be conveniently accessible with ample working area adjacent the connections and working components for subsequent servicing.

The service connections must however be enclosed to eliminate accidental or intentional tampering with the connection and to positively avoid shock hazards.

Further, in view of the relatively great number of units to be installed they must be relatively inexpensive and simple. However, because the units are generally remotely located from the central station, and exceptionally reliable and durable construction is necessary to reduce servicing of the pedestal itself to a very minimum.

A particularly simple and useful pedestal arrangement is shown in the copending patent application of John J. Skubal, entitled "Terminal Pedestal for Buried Wiring Systems," Serial No. 836,513, filed August 27, 1959, which is assigned to a common assignee with the present application. As more fully disclosed in that application, a generally channel-shaped spur member is adapted to be partially embedded in the ground. A ground line cover is secured to the pedestal adjacent the ground line and projects upwardly therefrom. An upper cover is secured to the spur, and a dome may be secured to the upper end of the spur, through the use of suitable corrosion resistant nut and bolt assemblies. Although specifically applied to underground telephone wiring systems, the structure shown therein is also adaptable to the conventional underground wiring power distribution system.

The present invention is directed to a pedestal construction generally similar to that shown in the above identified patent application of John J. Skubal and is particularly adapted to a simple and inexpensive coupling and interlocking means having a minimum number of parts.

Generally, in accordance with the present invention, a ground line cover having a pair of opposed vertical edges defining a vertical opening not greater than the width of a channel-shaped spur is provided. Cooperating slots and tabs are formed adjacent the edges of the ground line cover and the side wall portion of the spur. To initially interconnect the cover to the spur, the cover is deformed to align the tabs with the cooperating slots. The cover is then released to intermesh the tabs with the aligned slots and to thereby resiliently interlock the ground line cover extending circumferentially from one side of the spur to the other. The cover and spur define a vertical passage through which the buried conductors are extended. The spring tension in the ground line cover positively holds the ground line cover snugly in place to establish an essentially continuous enclosure. The connection eliminates the necessity for employing any special corrosion resistant coupling nuts and bolts or similiar elements.

A tubular cover overlies the upper end of the spur and associated terminal and operating components carried by the spur. The tubular cover is telescoped with the upper end of the ground line cover and is securely attached to the spur through a cooperating slot or opening and a clamping shaft provided on the lower portion of the cover and the adjacent portion of the spur. The clamping support connection electrically connects the dome to the spur and maintains the dome cover at the ground potential.

A locking tab is rigidly interconnected or secured to the upper end portion of the spur and is adapted to project outwardly through an aligned opening in the dome. The tab is adapted to accommodate a suitable lock in order to prevent unauthorized removal of the dome cover.

In assembling the dome cover to the spur, the dome cover is passed over the spur at a slight angle in order to clear the locking tab on the spur and to align the cooperating clamp shaft and the accommodating opening. The shaft and the opening in the aligned position insure alignment of the locking tab with the corresponding opening in the dome. The dome is then rotated to a vertical position with the locking tab passing through the opening in the dome. The lock is applied to the tab and the clamping shaft is securely drawn up to rigidly and firmly connect the dome cover to the spur.

The present invention provides a pedestal for underground wiring distribution systems or the like which is simple and low in cost. The pedestal is tamper-proof and pleasing in appearance. Further, by the simple removal of the dome, the terminals are conveniently accessible for subsequent servicing.

The drawing furnished herewith illustrates the best mode presently contemplated for carrying out the invention.

In the drawing:

FIG. 1 is a diagrammatic fragmentary illustration of the secondary side of a power distribution system;

FIG. 2 is an enlarged elevational view of a pedestal construction in accordance with the present invention;

FIG. 3 is a top view taken on line 3—3 of FIG. 2;

FIG. 4 is a reduced elevational view taken on the line 4—4 in FIG. 2;

FIG. 5 is a horizontal section taken on the line 4—4 of FIG. 2; and

FIG. 6 is a view showing the initial positioning of the dome cover during assembly of the dome cover to the spur.

Referring to the drawing and particularly to FIG. 1, a portion of a secondary distribution power system which is adapted to supply power to a dwelling 1 from an underground secondary main 2 is diagrammatically illustrated. The secondary main 2 is connected to a power distribution transformer, not shown, and dead ends in a terminal pedestal 3. The terminal pedestal 3 projects upwardly above the ground line immediately adjacent the secondary main 2. The pedestal 3 includes suitable terminal connecting means, as subsequently described, for interconnecting a secondary service lateral 4 to the secondary main 2. The secondary service lateral 4 extends through the ground from the pedestal 3 to the dwelling 1 where it is connected to one or more branch circuits, not shown, in the dwelling. A second underground secondary service lateral 5 is also shown projecting into the pedestal 3 and is adapted to be connected to serve some other dwelling or the like, not shown.

Referring particularly to FIGS. 2–5, a pedestal 3 constructed in accordance with the present invention is illustrated.

The illustrated pedestal 3 includes a support spur 6 which is driven partially into the ground 7 immediately adjacent the secondary main 2. An upper terminal bracket 8 and a lower terminal bracket 9 are secured by similar nut and bolt assemblies 10 to the upper end of the spur 6 in vertically spaced and aligned relation. Each of the illustrated brackets 8 and 9 is an inverted cup-shaped member having a rectangular cross-section with a short leg secured to the web of the spur 6 by the nut and bolt assembly 10 and having the base portion of the bracket projecting horizontally outwardly from the web of the spur 6. The brackets 8 and 9 are formed of any suitable insulating material and support a pair of main bus bars 11 of copper or the like for connection to secondary main 2.

The main copper bus bars 11 span the vertical gap between the terminal brackets 8 and 9 adjacent the spur 6. The bus bars 11 are secured to the opposite depending portions of the terminal brackets 8 and 9 by small nut and bolt units 12.

A secondary main connector 13 is bolted to the lower end of each of the bus bars 11 and project downwardly from the lower terminal bracket 9. The connector 13 terminates in a tubular portion within which the incoming end of the secondary main 2 is clamped by a securement bolt 14. The secondary main 2 includes a pair of conductors secured respectively one to each of the main bus bars 11.

A pair of fuse clips 15 are bolted to each of the bus bars 11 and are suitably shaped to releasably grasp a cartridge type fuse 16 having a standard blade end 17. The fuses 16 extend outwardly and downwardly from bus bars 11 and terminate in similar blade ends 18 which are resiliently grasped by fuse clips 19 for connection to the service laterals 4 and 5.

Fuse clip supports 20 in the form of insulating strips bridge the vertical gap between the forward portion of the terminal brackets 8 and 9 similar to bus bars 11. The fuse clip supports 20 are secured to the opposite depending portions of the terminal brackets 8 and 9 by suitable attachment bolt and nut units 21. The fuse clips 19 are secured to the supports 20 in vertically spaced relation in accordance with the spacing of the clips 15 carried by bus bars 11. Each of the fuse clips 19 extend angularly outwardly and downwardly and terminates in a tubular portion 22 to receive the incoming end of service laterals 4 and 5. A clamping bolt 23 threads through a corresponding opening in the tubular portion 22 and engages the end portion of laterals 4 and 5 to firmly electrically connect the laterals to the connector 16. Each service lateral 4 and 5 includes a pair of conductors which are connected to correspondingly positioned fuse clips 19 on opposite sides of brackets 8 and 9.

Ground bracket 24 is secured to the spur 6 by a bolt and nut unit 25 and projects outwardly generally in vertically spaced alignment with brackets 8 and 9. The ground bracket 24 is generally L-shaped with one leg of the bracket extending forwardly from spur 6 in a vertical plane. The ground bracket 24 is a good conductor of electricity and constitutes a ground connection through the spur 6. Ground lines 26 of service laterals 4 and 5 and the neutral 27 of secondary main 2 are attached to the ground bracket 24 to establish a good, electrical ground.

A three-sided or channel-shaped shield 28 is mounted extending vertically about the side and forward area of the connections to the bus bars 11 and ground bracket 24. A mounting brace 29 is bolted to the upper terminal bracket 8 and extends laterally outwardly. Aligned slots 30 are formed in opposite sides of the shield 28 to receive the opposite end of brace 29 and support the shield 28.

In accordance with the present invention, the several terminal and ground components described above are enclosed within a housing consisting of a ground line cover 31 and an overlying dome 32.

Referring particularly to FIGS. 2 and 5, the ground line cover 31 is partially buried in the ground with the spur 6 and projects upwardly terminating in vertically spaced relation to the previously described connection. The cover 31 is generally a tubular member having a circumferential portion removed for the complete length of the cover and arranged with the edges of the opening generally butting against the side walls of the spur 6. The circumferential portion removed in the illustrated embodiment of the present invention, generally corresponds to the external width or lateral dimension of the spur 6.

A pair of upper tabs 33 and a pair of lower tabs 34 project chordally from the opposite edges of the opening in cover 31. The spur 6 includes a pair of upper slots 35 and a pair of lower slots 36 which are formed by removing a portion of the adjoining edge of the web and the side walls defining the spur 6. The slots 35 and 36 are spaced in accordance with the spacing of the tabs 33 and 34 and are adapted to receive the tabs 33—34 to firmly interlock the ground line cover 31 to the spur 6. Referring particularly to FIG. 5, the ground line cover 31 is assembled to spur 6 by springing the cover 31 open sufficiently, as shown in dotted lines, to allow the tabs 33 and 34 to enter the slots 35 and 36 in the spur 6. The cover 31 is then released and the spring tension of the cover 31 holds the cover 31 snugly to the spur 6 and eliminates the need for expensive and troublesome corrosion resistant bolts or other fastening means.

The cover 31 and spur 6 form a vertical passage or housing extending from within ground 7 upwardly into the dome 32.

Referring particularly to FIGS. 2 and 3, the illustrated dome 32 is generally a tubular member having an integral end wall 37 closing the upper end of the dome. The dome 32 is projected downwardly over the spur 6 and the previously described connecting means with the open end of the dome telescoped slightly with the upper end of the ground line cover. As shown most clearly in FIG. 2, the dome 32 fits relatively closely about the ground line cover 31 to seal the interior of dome 32 from foreign elements.

A vertical slot 38 is provided in the lower edge of the dome 32 and is adapted to fit over the outer end of a small bolt 39 which is secured centrally of the web portion of spur 6. Bolt 39 is rigidly interlocked to spur 6 by a lock nut 40 which threads onto the bolt and abuts against the spur 6. The dome 32 slips onto the bolts 39 immediately adjacent the exterior surface of the lock nut 40 and a securement nut 41 is adapted to be tightened down against the dome 32 to draw the dome into secure and firm engagement with the lock nut 41. The dome 32 is thus clamped between the nuts 40 and 41 to support the dome 32 and to establish firm and positive electrical connection between the spur and the dome. Consequently the dome 32 is maintained at ground potential.

The dome 32 further includes a horizontal opening or slot 42 in the upper portion of the dome. A lock tab 43 projects vertically from the spur 6 through the horizontal opening 42. The outer end of the lock tab 43 includes an opening 44 which is adapted to receive the yoke portion 45 of a conventional key actuated lock 46.

The tab 43 is generally an L-shaped member having one leg spot welded or otherwise rigidly and securely attached to the web portion of the spur 6. Consequently with the lock 46 in the lock position, as illustrated in the drawing, the dome 32 cannot be removed from the spur 6 except by authorized personnel.

As shown in FIG. 6, the dome 32 is assembled by passing or positioning the dome 32 over the spur 6 at a slight angle so that the locking tab 43 is cleared. The vertical slot 38 is located on bolt 39 which also automatically aligns opening 42 with lock tab 43. The dome 32 is then pivoted on the bolt 39 to the vertical position with the tab 43 projecting through the opening 42 and with the lower end of the dome telescoped onto the ground line cover 31. The clamping nut 41 is tightened onto the bolt 39 to establish the positive grounding of dome 32 and spur 6 and lock 46 attached to prevent unauthorized tempering with the terminals and the connections.

The illustrated pedestal 3 is simple in construction and readily adapted to commercial construction. The dome 32 protects the components against weather and other elements and also makes the terminals readily accessible for servicing. The ground line cover is supported in place in a simple and positive manner. The telescoped dome 32 prevents opening of the ground line cover 31 and thus positively interlocks the cover to spur 6.

The present invention provides an above ground pedestal which is strong and durable and which is readily adapted to commercial manufacture practice. The device is also adapted for use in direct burial conduit encased cable systems having the conventional four inch conduit risers which project upwardly through the ground.

Various modes of carrying out the invention are contemplated as being within the scope of the following claims particularly pointing out and distinctly claiming the subject matter which is regarded as the invention.

I claim:

1. An enclosed pedestal for above ground interconnecting of conductors in an underground wiring system, which comprises a channel-shaped spur adapted to be partially driven into the ground adjacent the main line, connecting means secured to the upper portion of the spur and adapted to interconnect the conductors, a generally tubular ground line cover having a pair of opposed vertical edges defining an opening essentially not greater than the width of the spur, cooperating slots and tabs in the ground line cover and the spur to resiliently interlock the spur and ground line cover extending from one side of the spur to the other, the spring tension in the ground line cover holding the opposed vertical edges abutting the adjacent sides of the spur, and a dome adapted to be telescoped over the upper end of the spur and closely telescoped with the upper end of the ground line cover to enclose said connecting means.

2. An enclosed pedestal for above ground interconnecting of conductors in an underground wiring system which comprises a channel-shaped metallic spur adapted to be partially driven into the ground adjacent the main line, connecting means secured to the upper portion of the spur and adapted to interconnect the conductors, a tubular ground line cover secured to the spur adjacent the ground line of the spur to form a vertical passage to accommodate the conductors, a dome adapted to be disposed over the upper end of the spur and closely telescoped with the upper end of the ground line cover to enclose the connecting means and prevent removal of the cover prior to removal of the dome, means to connect the dome in firm electrical contact with the spur, said dome having an opening aligned with and immediately adjacent the spur, and a tab rigidly secured to said spur and projecting through said opening, said tab being adapted to accommodate a lock means to releasably interlock the dome to the spur and prevent unauthorized removal of the dome.

3. An enclosed pedestal for above ground interconnecting of conductors in an underground wiring system, which comprises a channel-shaped spur adapted to be partially driven into the ground adjacent the main line, connecting means secured to the upper portion of the spur and adapted to interconnect the conductors, a generally tubular ground line cover having a pair of opposed vertical edges defining an opening essentially not greater than the width of the spur, cooperating slots and tabs in the ground line cover and the spur to resiliently interlock the spur and ground line cover extending from one side of the spur to the other, the spring tension in the ground line cover holding the opposed vertical edges abutting the adjacent sides of the spur, a dome adapted to be telescoped over the upper end of the spur and closely telescoped with the upper end of the ground line cover to enclose said connecting means, and lock means adapted releasably to attach the dome in position to prevent removal of the dome and the ground line cover.

4. An enclosed pedestal for interconnecting conductors in an underground wiring system, which comprises a supporting and grounding spur having side wall portions and adapted to be partially driven into the ground adjacent the main line, connecting means mounted upon the upper portion of the spur, a ground line cover having a pair of opposed edges with an intermediate resilient portion and adapted to be assembled to the spur with the opposed edges immediately adjacent opposed portions of the spur, the opening defined by said vertical edges essentially being not greater than the width of the spur, cooperating slots and tabs in the ground line cover and the spur to resiliently interlock the ground line to the spur, a dome adapted to be disposed over the upper end of the spur and connecting means and closely telescoped with the upper end of the ground line cover, means to connect the dome in firm electrical contact with the spur, said dome having an opening aligned with and immediately adjacent the spur, and a tab rigidly secured to said spur and projecting through said opening, said tab being adapted to accommodate a lock means to releasably interlock the dome to the spur and prevent unauthorized removal of the dome.

5. An enclosed pedestal for interconnecting conductors in an underground wiring system, which comprises a supporting and grounding spur having side wall portions and adapted to be partially driven into the ground adjacent the main line, connecting means mounted upon the upper portion of the spur, a ground line cover having a pair of opposed edges and adapted to be assembled to the spur with the opposed edges immediately adjacent opposed portions of the spur, the opening defined by said vertical edges essentially being not greater than the width of the spur, cooperating slots and tabs in the ground line cover and the spur to resiliently interlock the ground line to the spur, a dome adapted to be disposed over the upper end of the spur and connecting means and closely telescoped with the upper end of the ground line cover, clamp means secured to the spur and adapted to releasably grasp a preselected portion of the dome to electrically connect the dome to the spur, said dome having a lock opening aligned with and immediately adjacent the spur, and a lock tab rigidly secured to said spur and projecting through said opening and adapted to accommodate a lock means to releasably interlock the dome to the spur and thereby prevent unauthorized removal of the dome, said clamp means being arranged with respect to said lock opening and said lock tab to align the latter with the clamp means engaging the dome.

6. An enclosed pedestal for interconnecting conductors in an underground wiring system, which comprises a supporting and grounding spur having side wall portions and adapted to be partially driven into the ground adjacent the main line, connecting means mounted upon the upper portion of the spur, a resilient metal ground line cover having a pair of opposed edges and adapted to be assembled to the spur with the opposed edges immediately adjacent opposed portions of the spur, the opening defined by said vertical edges essentially being not greater than the width of the spur, cooperating slots and tabs in the ground line cover and the spur to resiliently interlock the ground line, a dome adapted to be disposed over the upper end of the spur and connecting means and closely telescoped with the upper end of the ground line cover, bolt means secured to the spur immediately adjacent the lower portion of the dome, said dome having an opening in the lower portion adapted to fit over the bolt means, nut means adapted to be removably attached to the bolt means to attach the dome in firm electrical contact with the spur, said dome having a lock opening aligned with and immediately adjacent the upper end portion of the spur, and a tab rigidly secured to said spur and projecting through said opening, said tab being adapted to accommodate a lock means to releasably interlock the dome to the spur and prevent unauthorized removal of the dome.

7. An enclosed pedestal for above ground interconnecting of conductors in an underground wiring system which comprises a channel-shaped metallic spur having a web portion and perpendicular aligned side walls and adapted to be partially driven into the ground adjacent the main line, connecting means secured to the upper portion of the spur and adapted to interconnect the conductors, a cylindrical ground line cover of a resilient metal having a longitudinal portion generally corresponding to the web portion of the spur removed to define opposed vertical edges for the length of the cover, a plurality of vertically spaced projections extending chordally inwardly from the opposed vertical edges, said spur including similarly spaced openings in the junction of the web and side walls adjacent the ground line of the spur, said openings receiving said projections to releasably interconnect the ground line cover to the spur adjacent the ground line of the spur to form a vertical housing accommodating the rising conductors, a cylindrical dome having an inner diameter generally corresponding to the outer diameter of the ground line cover and having an upper end wall, said dome being disposed over the upper end of the spur and closely telescoped with the upper end of the ground line cover to enclose the connecting means and prevent removal of the cover prior to removal of the dome, a bolt secured to the web portion of the spur adjacent the upper portion of the ground line cover, said dome having a slot in the lower edge fitting over the bolt, a nut threaded onto said bolt to draw the dome into firm electrical contact with the spur, said dome having an opening aligned with the slot adjacent the spur, and a tab rigidly secured to said spur in alignment with said bolt and projecting through said opening, said tab allowing positioning of the dome over the spur with the bolt within the slot to permit assembly of the dome and having an opening in the outer end of the tab to accommodate a lock means to releasably interlock the dome to the spur and prevent unauthorized removal of the dome.

8. An enclosed pedestal for above ground interconnecting of conductors in an underground wiring system, which comprises a supporting and grounding channel-shaped spur adapted to be partially driven into the ground adjacent the main line, connecting means secured to the upper portion of the spur and adapted to interconnect the conductors, a ground line cover having a pair of opposed inwardly projecting vertical edges defining an opening not essentially greater than the width of the spur, and a plurality of cooperating slots and transversely directed tabs similarly vertically spaced in the ground line cover and the spur and resiliently interlocking the ground line cover to the spur with the ground line cover extending from one side of the spur to the other with the opposed vertical edges abutting the adjacent sides of the spur.

9. An enclosed pedestal for above ground interconnecting of conductors in an underground wiring system, which comprises a metallic spur having a web and perpendicular aligned side walls, said spur being adapted to be partially driven into the ground adjacent the main line, connecting means secured to the upper portion of the spur and adapted to interconnect the conductors and including a ground connection secured in electrical connection to the spur, a metal tubular cover having a longitudinal portion removed to define a pair of opposed vertical edges defining an opening generally corresponding to the distance between the side walls of the spur, upper and lower chordal tabs projecting from the vertical edges, and similarly spaced openings in the junction of the web and side walls of the spur to receive the tabs and resiliently interlock the ground line cover extending from one side of the spur to the other with the opposed vertical edges abutting the adjacent sides of the spur to define a protective vertical passage for the conductors in the underground wiring system.

10. An enclosed pedestal for above ground interconnecting of conductors in an underground wiring system, which comprises a channel-shaped spur adapted to be partially driven into the ground adjacent the main line, incoming bus bar means attached to said spur and having connecting means adapted to be connected to incoming power lines, an insulating fuse support attached to the spur in horizontally spaced relation to said bus bar means, fuse clips secured to said bus bar means and to said insulating fuse support to accommodate fuse means electrically interconnecting the fuse clips on the bus bar means to the fuse clips on said fuse support, a connecting means on the fuse clips secured to the insulating fuse support and adapted to be connected to incoming takeoff lines for individual connection to said incoming power lines, a generally tubular ground line cover having a pair of opposed vertical edges defining an opening essentially not greater than the width of the spur, cooperating slots and tabs in the ground line cover and the spur to resiliently interlock the spur and ground line cover extending from one side of the spur to the other, the spring tension in the ground line cover holding the opposed vertical edges abutting the adjacent sides of the spur, and a dome adapted to be telescoped over the upper end of the spur and closely telescoped with the upper end of the ground line cover to enclose said bus bar means and said fuse support.

11. An enclosed pedestal for above ground interconnecting of conductors in an underground wiring system, which comprises a channel-shaped spur adapted to be partially driven into the ground adjacent the main line, upper and lower supporting brackets of insulating material secured to said spur and having a vertical mounting surface extending forwardly from the spur in horizontally spaced relation, bus bars secured to the mounting surfaces adjacent the spur and spanning the gap between the brackets and having connecting means at the lower end for connection to incoming power lines, clip supporting strips of electrically insulating medium secured to the mounting surfaces in horizontally spaced and aligned relation to said bus bars, fuse clips secured to the bus bars and the clip supporting strips to accommodate fuse members electrically connecting the fuse clips on the bus bar means to the fuse clips on the fuse supporting strips, the fuse clips on the fuse supporting strips having connecting means for connection to takeoff lines for individual connection of the takeoff lines to the power lines, a ground bracket attached to the spur below said lower supporting bracket and having connecting means for connection to ground lines associated with said power lines and said takeoff lines, a generally tubular ground line cover having a pair of opposed vertical edges defining an opening essentially not greater than the width of the spur, cooperating slots and tabs in the ground line cover and the spur to resiliently interlock the spur and ground line cover extending from one side of the spur to the other, the spring tension in the ground line cover holding the opposed vertical edges abutting the adjacent sides of the spur, and a dome adapted to be telescoped over the upper end of the spur and closely telescoped with the upper end of the ground line cover to enclose the connection of the power lines and the takeoff lines.

12. An enclosed pedestal for above ground interconnecting of conductors in an underground wiring system, which comprises a channel-shaped spur adapted to be partially driven into the ground adjacent the main line, upper and lower supporting brackets of insulating material secured to said spur and having a vertical mounting surface extending forwardly from the spur in horizontally spaced relation, bus bars secured to the mounting surfaces adjacent the spur and spanning the gap between the brackets and having connecting means at the lower end for connection to incoming power lines, clips supporting strips of electrically insulating medium secured to the mounting surfaces in horizontally spaced and aligned relation to said bus bars, fuse clips secured to the bus bars and the clip supporting strips to accommodate fuse members electrically connecting the fuse clips on the bus bar means to the fuse clips on the fuse supporting strips, the fuse clips on the fuse supporting strips having connecting means for connection to takeoff lines for individual connection of the takeoff lines to the power lines, a ground bracket attached to the spur below said lower supporting bracket and having connecting means for connection to ground lines associated with said power lines and said takeoff lines, a channel-shaped shield extending about the sides and forward end of the supporting brackets and ground bracket and the connection thereto and having slots in the upper opposed portion, a cross arm secured to the upper supporting bracket and extending laterally therefrom and extending into said slots to support the shield, a generally tubular ground line cover having a pair of opposed vertical edges defining an opening essentially not greater than the width of the spur, cooperating slots and tabs in the ground line cover and the spur to resiliently interlock the spur and ground line cover extending from one side of the spur to the other, the spring tension in the ground line cover holding the opposed vertical edges abutting the adjacent sides of the spur, and a dome adapted to be telescoped over the upper end of the spur and closely telescoped with the upper end of the ground line cover to enclose the connection of the power lines, the takeoff lines and the shield.

References Cited in the file of this patent

UNITED STATES PATENTS

| | | |
|---|---|---|
| 796,007 | Packard | Aug. 1, 1905 |
| 1,204,412 | Cook | Nov. 14, 1916 |
| 1,667,871 | Sachs | May 1, 1928 |
| 2,014,586 | Rah | Sept. 17, 1935 |
| 2,063,099 | Loock | Dec. 8, 1936 |
| 2,916,539 | Hamilton | Dec. 8, 1959 |

FOREIGN PATENTS

| | | |
|---|---|---|
| 717,629 | Great Britain | Oct. 27, 1954 |

OTHER REFERENCES

Publication: The Utility Buried Cable Terminals, by Utility Products Company, 3111 W. Mill Road, Milwaukee 9, Wisconsin.